United States Patent [19]

Komurasaki

[11] Patent Number: 4,793,310
[45] Date of Patent: Dec. 27, 1988

[54] ELECTRONIC IGNITION CONTROL APPARATUS INCLUDING KNOCKING CONTROL

[75] Inventor: Satoshi Komurasaki, Hyogo, Japan

[73] Assignee: Mitsubishi Denki Kabushiki Kaisha, Tokyo, Japan

[21] Appl. No.: 128,136

[22] Filed: Dec. 3, 1987

[51] Int. Cl.[4] .............................. F02P 5/14
[52] U.S. Cl. ................... 123/425; 123/435; 123/418
[58] Field of Search .............. 123/425, 435, 419, 418; 73/35

[56] References Cited

U.S. PATENT DOCUMENTS

| | | | |
|---|---|---|---|
| 4,377,999 | 3/1983 | Kamurasaki et al. | 123/425 |
| 4,607,602 | 8/1986 | Kamurasaki | 123/425 |
| 4,675,821 | 6/1987 | Aoki et al. | 123/425 |
| 4,699,105 | 10/1987 | Jensen | 123/425 |
| 4,708,113 | 11/1987 | Harada et al. | 123/425 |
| 4,709,678 | 12/1987 | Yagi et al. | 123/425 |
| 4,710,881 | 12/1987 | Mouri et al. | 123/425 |
| 4,711,213 | 12/1987 | Sakakibara et al. | 123/425 |

Primary Examiner—Raymond A. Nelli
Attorney, Agent, or Firm—Lowe, Price, LeBlanc, Becker & Shur

[57] ABSTRACT

In an electronic ignition, e.g., knocking control apparatus, an acceleration sensor is mechanically coupled to an internal-combustion engine to detect a vibration signal containing not only mechanical vibration information but also knocking information. The vibration signal is first processed in a noise level detector to obtain a reference voltage signal. A rotation-number detector receives a reference revolution signal representative of an engine speed of the internal-combustion engine so as to derive a revolution-speed detecting signal. A gate timing controller receives both the reference revolution signal and the revolution-speed detecting signal to produce a gate control signal. The vibration signal is secondly processed in a comparator based upon the reference voltage signal from the noise level detector so as to obtain an ignition signal. Supply of the vibration signal from the acceleration sensor to the comparator is interrupted by an analog gate based upon the gate control signal so as to suppress the knocking phenomenon.

18 Claims, 10 Drawing Sheets

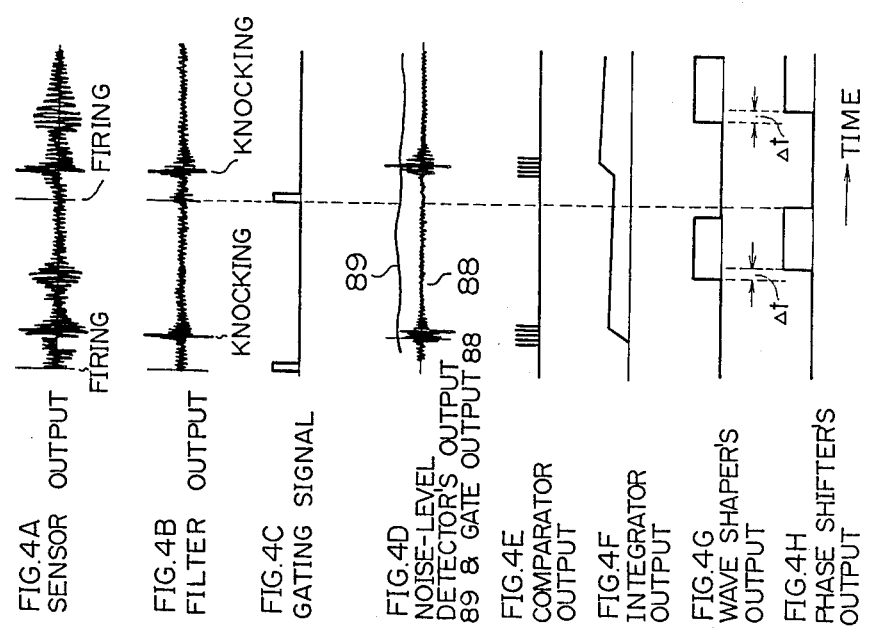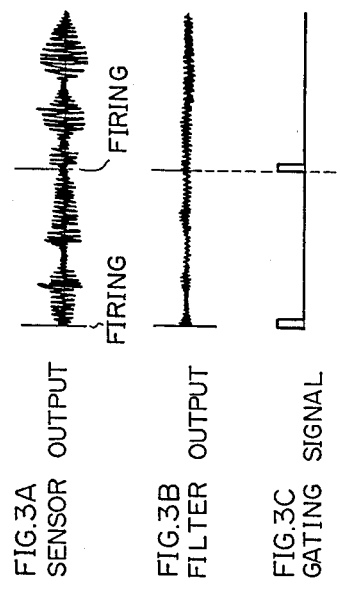

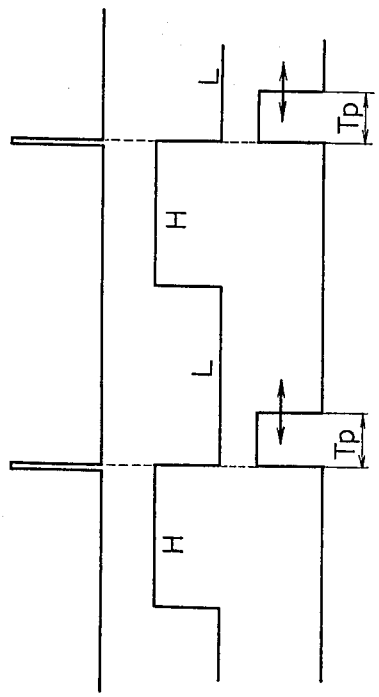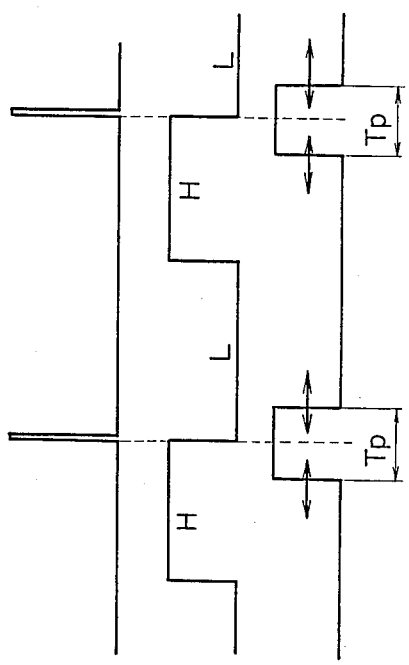

FIG. 8A IGNITION SIGNAL

FIG. 8B PULSE SIGNAL

FIG. 8C INPUTS TO COMPARATOR 54

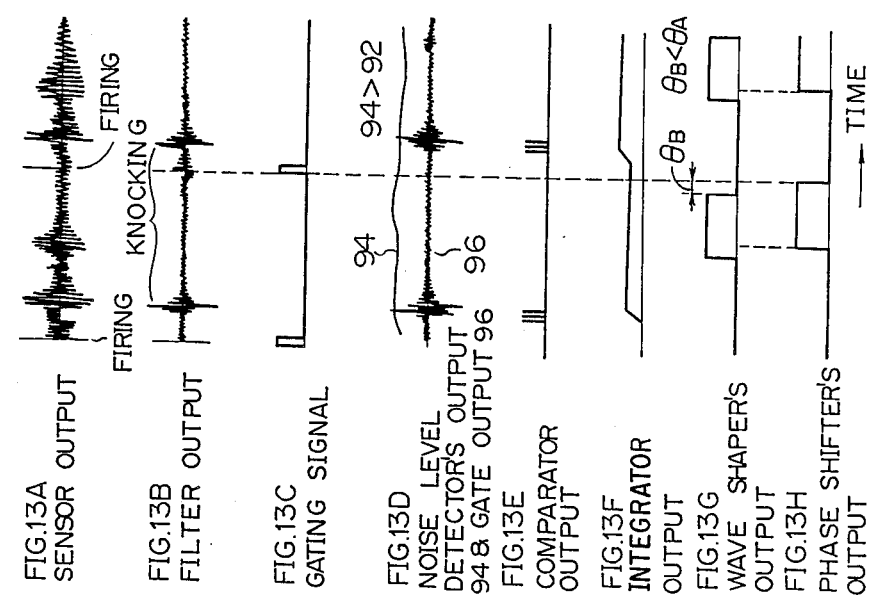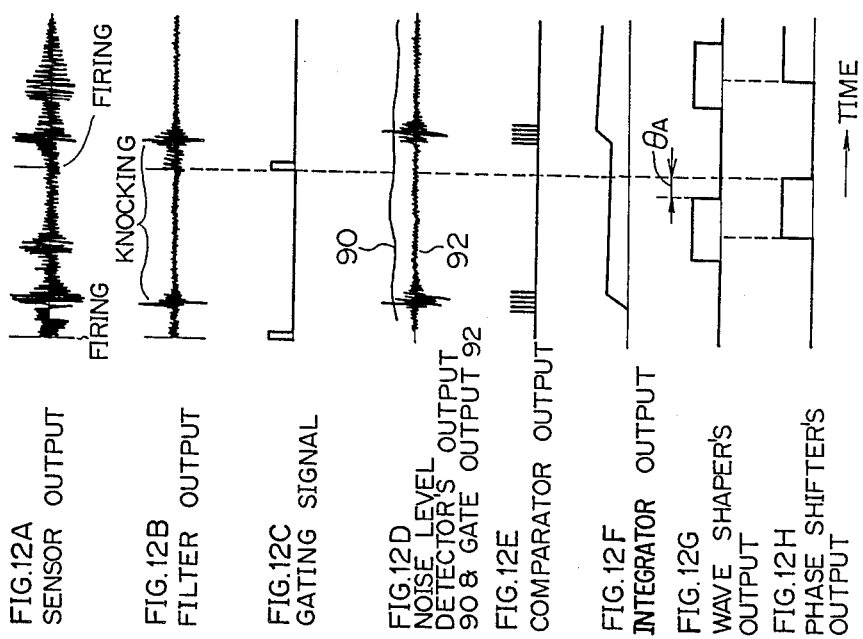

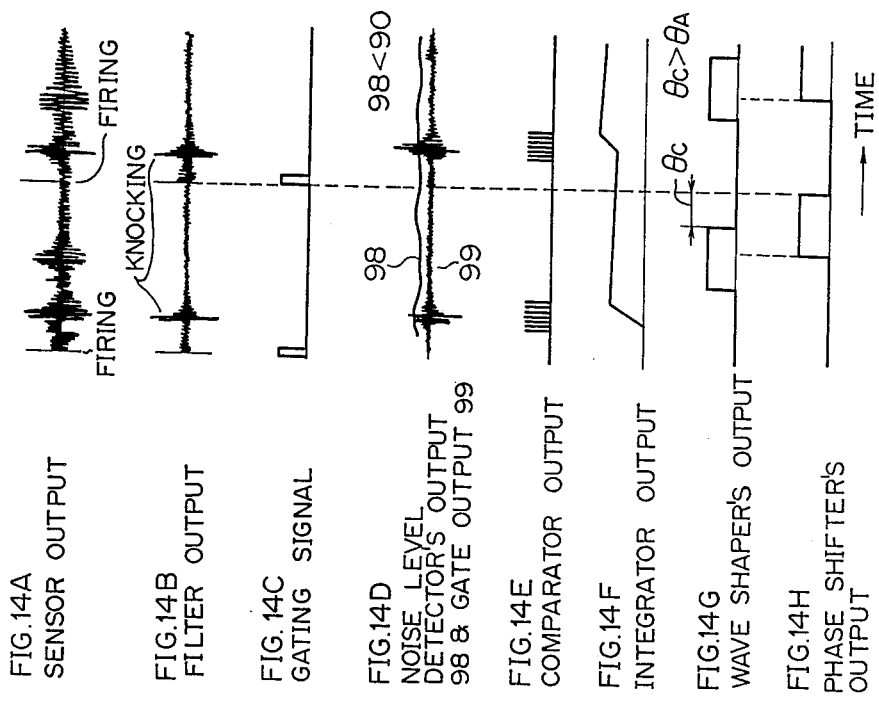

ELECTRONIC IGNITION CONTROL APPARATUS INCLUDING KNOCKING CONTROL

BACKGROUND OF THE INVENTION

1. Field of the Invention

The present invention relates to an electronic ignition control apparatus, or a knock control apparatus for an internal-combustion engine, which ensures the detection of a knock phenomenon without restriction to the characteristic of the engine, such as the driving state thereof.

2. Description of the Related Art

Control systems for detecting and suppressing a knock phenomenon occurring in an internal-combustion engine, include a fuel control system, an ignition timing control system and a pressure gate control system. The ignition timing control system, the most frequently used system of these control systems will now be explained.

The following describes a knock control (ignition control) apparatus that utilizes the conventional ignition timing control system for an internal-combustion engine as shown in FIG. 1. Such in ignition timing control type knock control apparatus is known, for instance, from U.S. Pat. No. 4,377,999. The ignition timing control system includes an acceleration sensor 1 for sensing an acceleration of a mechanical vibration of an internal-combustion engine 30, a frequency filter 2 for passing that signal component of the output signal from the acceleration sensor 1 which has a high frequency sensible to knocking; an analog gate 3 for cutting off noise contained in the filtered signal of the frequency filter 2 which may interfere with the detection of such a knock phenomenon, and a gate timing controller 4 for controlling the operation of the analog gate 3 in accordance with the occurrence of the noise.

The output of the frequency filter 2 that has passed through the analog gate 3 is supplied to a noise level detector 5 and a comparator 6 as well.

This noise level detector 5 detects the level of noise caused by other mechanical vibrations of the internal-combustion engine 30 than the knock phenomenon and sends it to the comparator 6. This comparator 6 compares the output of the analog gate 3 with the output of the noise level detector 5 to produce a knock detecting pulse and sends this pulse to an integrator 7.

The integrator 7 integrates the knock detecting pulse from the comparator 6 and produces an integrated voltage according to the knocking intensity. The integrated voltage is supplied to a phase shifter 8, which shifts the phase of a reference ignition signal in accordance with the output of the integrator 7.

Reference numeral 9 is a revolution signal generator that produces the above-described reference ignition (revolution) signal according to a preset ignition advance angle characteristic. The output of the revolution signal generator 9 is wave-shaped in a waveform shaper 10 which, at the same time, executes the duty angle controlling for energization of an ignition coil 12.

A switching circuit 11 is responsive to the output signal of the phase shifter 8 to interrupt the power supply to an ignition coil 12. This coil 12 generates an ignition pulse which is supplied, to a spark plug (not shown).

FIG. 2 illustrates the frequency characteristics of the output signal, or vibration signal of the acceleration sensor 1. In FIG. 2, numerals 80 and 82 indicate the frequency characteristics in the absence of a knocking phenomenon and in the presence of a knocking phenomenon, respectively.

The output signal of the acceleration sensor 1 contains a knock signal (i.e., the signal generated during a knock phenomenon), other mechanical noise components originating from the vibration of the internal-combustion engine 30 and various noise components passing through signal transfer paths, for example, ignition noise. From the comparison of the frequency curve 80 with the curve 82 of FIG. 2, it is readily understood that the knock signal has a specific frequency distribution characteristic.

Although the difference in the frequency distribution characteristic between these two curves depends on the type of the internal-combustion engine in use and also where the acceleration sensor 1 is mounted, one is clearly distinguished from the other with regard to whether or not the knocking phenomenon occurs in the engine.

In this respect, therefore, filtering the frequency component of the knock signal suppresses the noise of the other frequency components thereby to effectively detect the knock signal.

FIGS. 3 and 4 illustrate the waveforms of individual circuit components of FIG. 1 in one-to-one correspondence. FIG. 3 is for the operation mode where no knocking is caused in the internal-combustion engine 30, whereas FIG. 4 is for the operation mode where knocking is caused in the engine 30.

Referring now to FIGS. 3 and 4, the operation of the conventional knock control apparatus for the internal-combustion engine 30 as shown in FIG. 1 will be explained. When the internal-combustion engine 30 is rotated, an ignition signal is produced as a reference ignition signal from the revolution signal generator 9 in accordance wit the preset ignition timing characteristic. This ignition signal is wave-shaped into a pulse having a desired duty angle by the waveform shaper 10, and this pulse drives switching circuit 11 through the phase shifter 8 to interrupt the power supply to the ignition coil 12. The ignition voltage that is induced across the ignition coil 12 by the interruption of the coil energization ignites the spark plug and operates the engine 30.

The engine 30 in operation causes mechanical vibrations, which are all detected by the acceleration sensor 1.

Without knocking caused in the internal-combustion engine 30, no knocking-dependent mechanical vibrations would occur, but there would be other mechanical vibrations which could cause the output signal of the acceleration sensor 1 to have mechanical noise as shown in FIG. 3A and ignition noise passing through the signal transfer paths at each ignition timing (FIRING).

The mechanical noise component of this output signal, when filtered by the frequency filter 2, is significantly suppressed as shown in FIG. 3B. However, since the ignition noise component is stronger than the mechanical noise component, it is not reduced so much after passing the frequency filter 2.

Such an output waveform is likely to cause the ignition noise to be mistaken as the knocking signal, so that the analog gate 3 is opened for some period of time from the ignition timing by the output (see FIG. 3C) of the gate timing controller 4 that is triggered by the output of the phase shifter 8. With the gate 3 opened, the ignition noise from the frequency filter 2 is inhibited from going to the comparator 6. As a consequence, the output of the analog gate 3 contains only a low-leveled mechanical noise as indicated by 84 in FIG. 3D.

In response to a change in the peak of the output signal of the analog gate 3, the noise level detector 5 produces a DC voltage whose level is slightly higher than the peak of the mechanical noise (see 85 in FIG. 3D). In this case, the noise level detector 5 has a characteristic which is responsive to a relatively gentle change in the peak of the output signal of the analog gate 3 that is caused by the peak of ordinary mechanical noise.

Since the output 85 of the noise level detector 5 is greater than the average peak value of the output signal 84 of the analog gate 3 as shown in FIG. 3D, the comparator 6 for comparing these output with each other would have no output as shown in FIG. 3E. As a result, all the noise signals except the knocking signal can be removed.

Under these circumstances, therefore, the output voltage of the integrator 7 remains null as shown in FIG. 3F and the phase angle of the phase shifter 8 becomes zero as well. The phase angle here means the phase difference between the output (FIG. 3G) of the waveform shaper 10 and the output (FIG. 3H) of the phase shifter 8.

The switching phase of the switching circuit 11 that is driven by the output, or ignition signal (FIG. 3G) of the phase shifter 8, i.e., the intermittent phase of the energization of the ignition coil 12, is the same as the phase of the reference ignition signal (FIG. 3G) from the waveform shaper 10. Consequently, the ignition timing becomes the reference ignition timing.

Now with knocking caused in the internal-combustion engine 30, the output of the acceleration sensor 1 contains knocking-dependent noise at around a point of time with some delay from the ignition timing as shown in FIG. 4A, and the signal passing through the frequency filter 2 and the analog gate 3 is a high knock signal superimposed on mechanical noise as indicated by 88 in FIG. 4D.

Of the signals passing through the analog gate 3, the knocking signal has a sharp rising so that the level of the output voltage 89 from the noise level detector 5 (which is substantially identical to the voltage 85 in FIG. 3D) has a slow response to the knock signal.

Consequently, the inputs of the comparator 6 have the waveforms 88 and 89 in FIG. 4D, respectively, so that the comparator's output has a pulse as shown in FIG. 4E.

The integrator 7 integrates this pulse and produces the integrated voltage as shown in FIG. 4F. Then, in accordance with the output of the integrator 7, the phase shifter 8 retards the phase of the output signal (FIG. 4G) of the waveform shaper 10, or the phase of the reference ignition signal. Consequently, the output of the phase shifter 8 lags by Δt (delta "t") from the phase of the reference ignition signal from the waveform shaper 10, and drives the switching circuit 11 with its phase as shown in FIG. 4H. This delays the ignition timing thereby to suppress knocking. Then, the driving states of the internal-combustion engine 30 shown in FIGS. 3 and 4 are repeated to achieve the optimum ignition timing control.

Depending on the driving characteristics of the engine 30, the level ratio of the two inputs of the comparator 6 cannot be set to the proper ratio value to perform the desired knocking phenomenon detection. In other words, the ability of the comparator 6 to discriminate the knocking signal from mechanical noise with the detected noise signals 85 and 89 of the noise level detector 5 as the threshold levels, would be undesirably deteriorated.

The driving characteristics of the engine 30 implies the voltage characteristic of two input signals to the comparator 6 with respect to the rotation of the engine: the first input signal to the comparator being the waveform 84 in FIG. 3D or waveform 88 in FIG. 4D (each being the output of the analog gate 3) and the other input signal being the waveform 85 in FIG. 3D or waveform 89 in FIG. 4D (the output of the noise level detector 5). That is, the engine's driving characteristic is determined by the vibration characteristic of the engine 30 and the detection characteristic of the acceleration sensor 2.

According to the above conventional knock, or ignition control apparatus, in consideration of the characteristic to detect the knocking phenomena caused in different rotation regions of the internal-combustion engine and the system design plan, the knocking detection characteristic should be set at the sacrifice of some of the knocking control ability.

With the above conventional drawwbacks, it is an object of the present invention to provide a knock, or ignition control apparatus for an internal-combustion engine, which is capable of directly controlling the output voltage characteristic of a noise level detector in accordance with the driving state of the engine.

SUMMARY OF THE INVENTION

The above object of the present invention is accomplished by providing an electronic ignition control apparatus 100 comprising:

a first detector 1 for detecting mechanical vibrations of an internal-combustion engine 30 to derive a vibration signal containing at least mechanical noise information and knocking phenomenon information of the internal-combustion engine 30;

a gating circuit 3 for gating the vibration signal supplied from the first detector 1;

a second detector 5 for detecting a noise level of said vibration signal derived from the first detector 1 via the gating circuit 3 to produce a reference voltage signal;

a generator 9 for generating a reference revolution signal representative of revolution conditions of the internal-combustion engine 30;

a processing circuit (6;7;8) for processing the vibration signal directly supplied from the first detector 1 via the gating circuit 3 based upon the reference voltage signal of the second detector 5 and the reference revolution signal of the generator 9, so as to produce an ignition signal;

a third detector 21 for detecting the ignition signal from the processing circuit (6;7;8) to produce a revolution-speed detecting signal corresponding to the revolution speed of the internal-combustion engine 30; and a gate controlling circuit 24 for producing a gate control signal by receiving both the ignition signal and the revolution-speed detecting signal, whereby the gating circuit 3 is controlled in response to the gate control signal in order to interrupt supply of the vibration signal to the processing circuit (6;7;8) via the gating circuit 3 while the knocking phenomenon occurs, a time period of the vibration signal interruption being varied in response to the drive conditions of the internal-combustion engine 30 so as to suppress the knocking phenomenon of the internal-combustion engine 30.

BRIEF DESCRIPTION OF THE DRAWING

The purpose and advantages of the present invention will become apparent to those skilled in the art from the following detailed description in conjunction with the accompanying drawings, in which:

FIGS. 3A to 3H and 4A to 4H illustrate waveforms of the circuit elements in the knock control apparatus shown in FIG. 1;

FIGS. 6A to 6C show waveforms of the gate control signal and ignition signal;

FIGS. 12A to 12H and 13A to 13H and 14A to 14H illustrate waveforms of the ignition controlling operations of the apparatus 100 shown in FIG. 5;

FIGS. 15A to 15C illustrate waveforms of the ignition signal and gate control signal according to another example.

DETAILED DESCRIPTION OF THE PREFERRED EMBODIMENTS

Basic Idea

Figure 1:
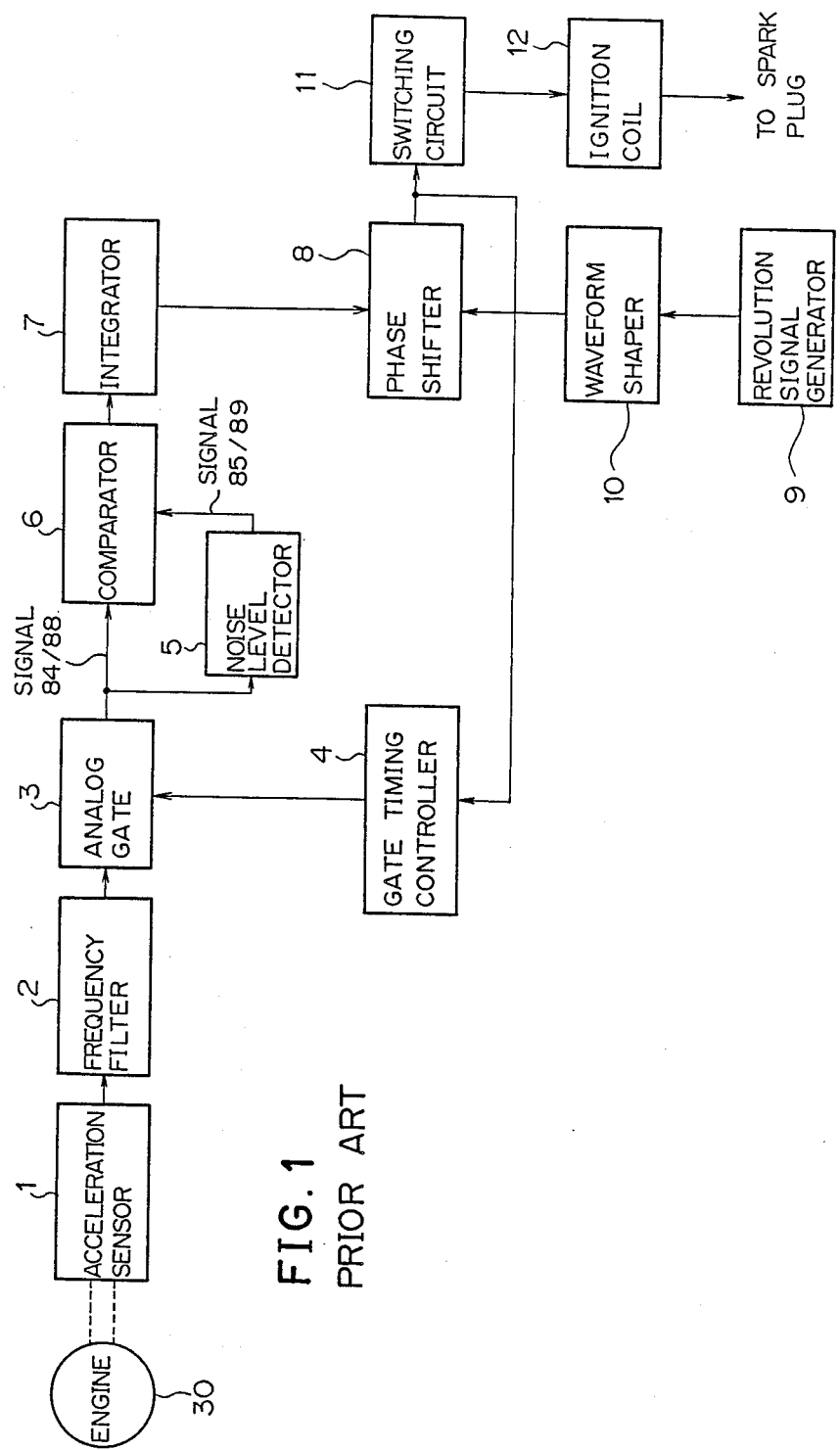
FIG. 1 is a schematic block diagram of the conventional knock control apparatus.
Figure 2:
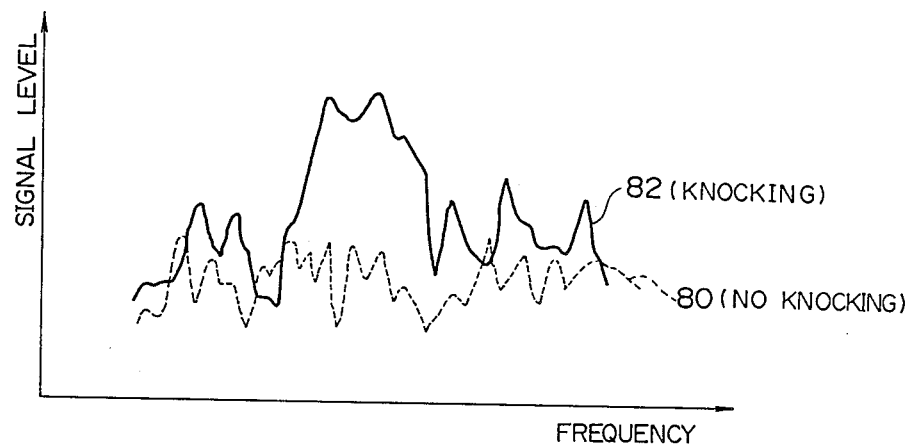
FIG. 2 is a graphic representation of the frequency characteristic of noise signals.

According to the basic idea of the present invention, a filtered vibration signal containing at least a knocking information signal representative of a knock phenomenon and a mechanical noise signal, is acquired by filtering the frequency of a vibration signal attained from an internal-combustion engine. This filtered vibration signal is supplied through gate means to comparator means directly and through noise level detector means for comparison purpose. The comparison result is then processed in integrator/phase shifter means based on a revolution reference signal that represents the revolution of the internal-combustion engine, thereby providing an ignition signal. This ignition signal is used to firstly generate an ignition pulse for igniting a spark plug, and secondly to control the gate means. That is, based upon this ignition signal, the revolution speed detector/gate timing controller means produces a gate control signal. In response to the gate control signal, the ON/OFF control of the gate means is executed to transfer/interrupt the filtered vibration signal to the comparator means and also noise level detector means for a given period of time (i.e., a duration in which the gate control signal is kept in the ON state, or OFF state), whereby the resultant ignition signal is controlled in accordance with the driving characteristic of the internal-combustion engine.

More specifically, the resultant ignition signal is produced by shifting the phase of the reference revolution signal in accordance with the knocking information signal. Based on the ignition signal and the reference revolution signal, a gate control signal is produced to open the gate means for a given period of time under the ignition timing of that signal as a reference (i.e., to interrupt the supply of the vibration signal to the comparator and noise level detector). In response to this gate control signal, the supply of the filtered vibration signal to the comparator means and also phase shifter means from the gate means is stopped with a function of time corresponding to the revolution speed of the internal-combustion engine with the ignition timing as a reference. As a consequence, the capability of the comparator/phase shifter means to discriminate the knocking information signal from an undesirable mechanical noise signal is improved.

In brief, in the electronic ignition control apparatus which detects the knocking information of the internal-combustion engine 30, detects a signal representing a knocking phenomenon from a result of comparison between this knocking information and a reference voltage attained by the vibration signal and suppresses the knocking phenomenon occurred in the internal-combustion engine 30, the particular feature lies in that the vibration signal sensed from the internal-combustion engine 30 which is an input signal to a circuit for generating the reference voltage, is interrupted for a certain period of time and this interrupt duration is controlled in accordance with the driving state of the internal-combustion engine 30 in operation.

There are following three methods for controlling the ON-duration time (Tp) of the gate control signal. Based upon the generation timing of the ignition pulse, this ON-duration time is determined by a voltage signal output from a revolution speed detector that receives the ignition signal.

(1) The gate control signal is generated for some period of time with a delay from the ignition timing (generation timing of the ignition pulse). This ON-duration time (Tp) is either fixed or may be varied.

(2) The gate control signal is generated before and after (i.e., with an advance and a delay) the ignition timing The ON-duration time of this signal is the same as is in the above case. In this case, however, the center of the ON-duration time either coincides or does not coincide with the ignition timing.

(3) The gate control signal is generated only prior to the ignition timing. The ON-duration time is also the same as is in the first method.

FIRST IGNITION CONTROLLING MODE

Figure 5:
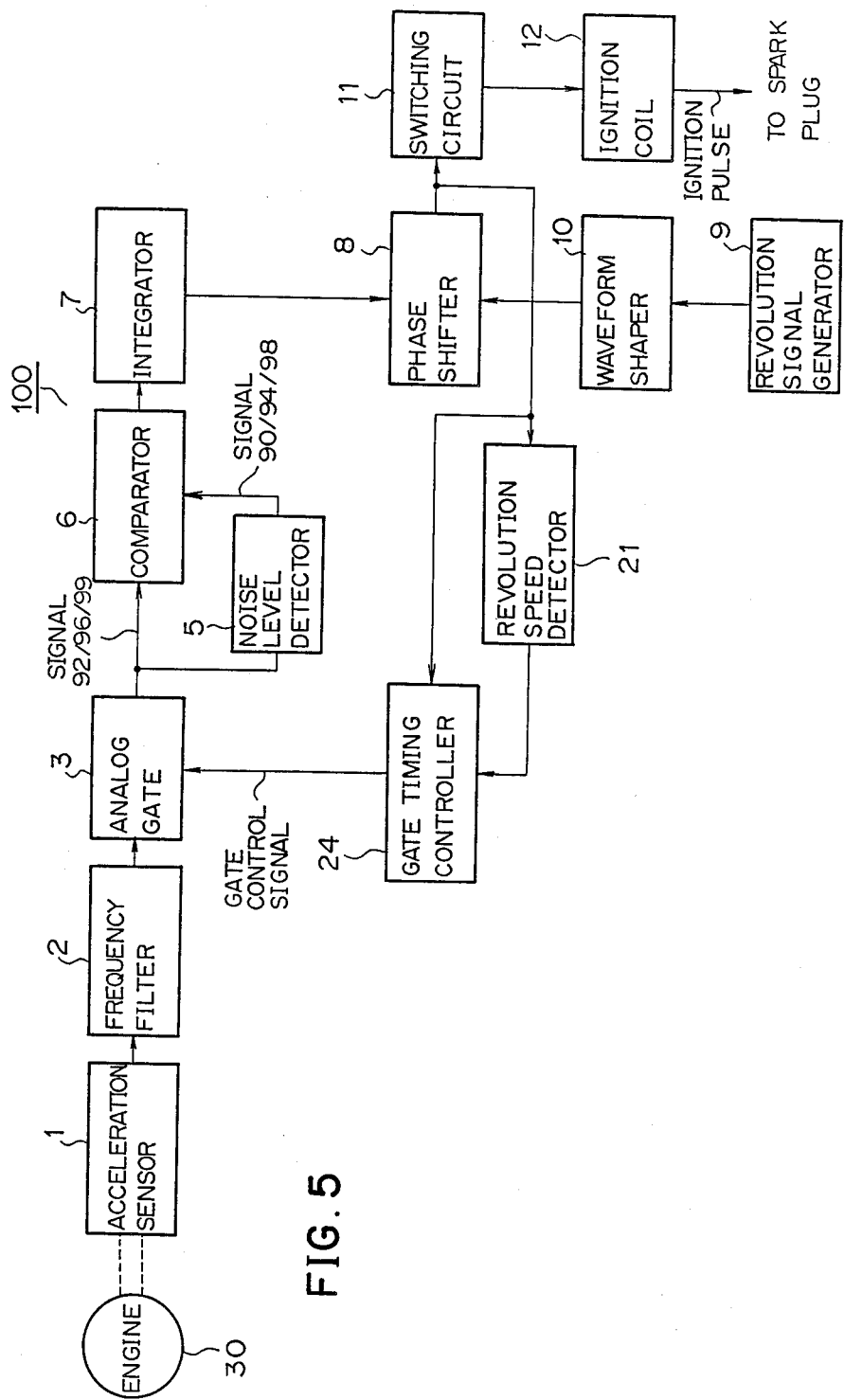
FIG. 5 is a schematic block diagram of an ignition controlling apparatus 100 according to a first preferred embodiment of the invention.

Referring now to FIG. 5, an ignition (or knocking) controlling apparatus 100 according to the first embodiment of this invention will be described in detail.

The following is a summary of the features of this embodiment.

There is provided a revolution speed (or, rotational speed) detector 21 which produces a voltage signal corresponding to the revolution speed of an internal-combustion engine 30, based upon the period of an ignition signal supplied from a phase shifter. In accordance with this voltage signal from the revolution speed detector, an ON-duration time Tp for a gate control signal that is generated after the ignition timing, is varied with the ignition timing (ignition pulse generation timing) as a reference (i.e., the aforementioned method (1) for generating the gate control signal). Upon receipt of this gate control signal, a gate is opened for the ON-duration time Tp so that the transfer of the filtered vibration signal to a comparator is stopped, or interrupted. Accordingly, the capability of the comparator to discriminate the knocking information signal from an undesirable mechanical noise signal is improved.

CIRCUIT ARRANGEMENT

FIG. 5 is a block diagram of the ignition control apparatus 100. As should be understood from this diagram, most of the circuit elements of a circuit system for processing the vibration signal from the acceleration sensor 1 mounted in the internal-combustion engine 30, are similar or correspond to those used in the above-described conventional knocking control apparatus. To avoid redundancy, therefore, only those circuit systems distinguishing the first embodiment from the conventional apparatus will be explained, omitting the description of the functions of the already-explained circuit elements.

In FIG. 5, the output from a phase shifter 8 is supplied to the switching circuit 11 as well as to a revolution speed detector 21 and a gate timing controller 24. The output from the revolution speed detector 21 is supplied to a gate timing controller 24 whose output is in turn supplied to the analog gate 3.

The revolution speed detector 21 has a function to produce a voltage signal corresponding to the number of rotations of the internal-combustion engine 30 on the basis of the period of the ignition signal that is the output of the phase shifter 8. The gate timing controller 24 has a function to generate a gate control signal by processing the ignition signal from the phase shifter 8 and the voltage signal from the revolution speed detector 21.

OVERALL OPERATION

The overall operation of the ignition control apparatus 100 of FIG. 5 operated in a first mode will now be briefly explained, referring to the waveform diagram of FIGS. 6A to 6C that illustrate the output signal of the phase shifter 8, the gate control signal from the gate timing controller 24, and the ignition pulse, respectively.

The reference revolution signal, which is generated from a revolution signal generator 9 in accordance with the ignition timing characteristic preset by the revolution speed of the internal-combustion engine 30, is wave-shaped by the waveform shaper 10 into a pulse having a desired duty angle. This pulsatory reference revolution signal drives the switching circuit 11 through the phase shifter 8 and interrupts the power supply to the ignition coil 12. The spark plug (not shown) is energized by the ignition pulse (see FIG. 6A) of the ignition coil 12 which is generated upon interruption of the energization current in the ignition coil 12, thereby driving the internal-combustion engine 30.

All the mechanical vibrations occurring during operation of the engine 30 are detected by the acceleration sensor 1 to be a vibration signal.

In the case where no knocking has occurred in the internal-combustion engine 30, no knocking-dependent vibrations would occur. As mentioned earlier, however, there would be other mechanical vibrations which could cause the output signal of the acceleration sensor 1 to contain mechanical noise and ignition noise passing through the signal transfer paths at each ignition timing.

The mechanical noise component of this sensor output signal, when filtered by the frequency filter 2, is significantly suppressed as described above. Since the ignition noise component is stronger than the mechanical noise component, however, it is not reduced so much after passing through the frequency filter 2.

Such a filter output waveform is likely to cause the ignition noise to be mistaken as the knocking signal, so that the analog gate 3 is opened for some period of time from the ignition timing in response to the gate control signal supplied from the gate timing controller 24 that is triggered by the output of the revolution speed detector 21. With the gate 3 opened, the ignition noise from the frequency filter 2 is inhibited from going to the comparator 6. As a consequence, the output of the analog gate 3 contains only low-leveled mechanical noise as described earlier.

In response to a change in the peak of the output signal of the analog gate 3, the noise level detector 5 produces a DC voltage whose level is slightly higher than the peak of the mechanical noise. In this case, the noise level detector 5 has a characteristic which is responsive to a relatively gentle change in the peak of the output signal of the analog gate 3 that is caused by the peak of ordinary mechanical noise.

Since the output of the noise level detector 5 is greater than the average peak value of the output signal of the analog gate 3 as explained earlier, the comparator 6 for comparing these outputs with each other would have no output. As a result, all the noise signals except the knocking signal can be removed.

Consequently, the output voltage of the integrator 7 remains null so that the phase angle of the output of the phase shifter 8 becomes zero.

As per the aforementioned case, therefore, the intermittent phase of the energization voltage of the ignition coil 12 becomes the same phase as that of the reference ignition signal from the waveform shaper 10. Consequently, the ignition timing of the spark plug coincides with the reference ignition timing.

Now in the case where knocking is caused in the internal-combustion engine 30, a signal representing the knocking phenomenon is input to the comparator 6 wth a predetermined delay from the reference ignition timing. The comparator 6 in turn produces a comparison output having a predetermined amplitude. This comparison output is furthermore processed in the integrator 7 and the phase shifter 8 so as to drive the ignition coil 12. In this case, as will be described later, since the output of the phase shifter 8 is properly processed in the revolution speed detector 21 and the gate timing controller 24 to generate the gate control signal (see FIG. 6C) which is used to properly control the open duration of the analog gate 3, the succeeding knocking signal is prevented from going via the gate 3 to the comparator 6.

As described in detail, according to this embodiment, the ignition operation of the spark plug energized by the ignition coil 12 is controlled with a predetermined delay from the aforementioned reference ignition timing. With this ignition control, the ignition timing is optimally performed according to the driving state of the internal-combustion engine 30.

GATE TIMING CONTROLLER

The operation of gate timing controller 24 shown in FIG. 5 will now be described in detail.

First, the ignition signal shown in FIG. 6B from the phase shifter 8 is supplied to the gate timing controller 24. The high-voltage ignition pulse shown in FIG. 6A is generated by the ignition coil 12 at the proximity of the trailing edge of the H-level signal portion of the ignition signal. The ignition timing is determined at the point where the H-level signal (FIG. 6B) of the phase shifter 8 falls, and the gate control signal is output from the gate timing controller 24 in synchronism with this ignition timing. This gate control signal, which has the duration time Tp corresponding to the voltage signal from the rotation number detector 21 with the falling (ignition timing) of the H-level signal portion of the gate control signal as a reference point (see FIGS. 6A and 6B), is sent to the analog gate 3. This duration time Tp can be a fixed value or can be varied as needed.

PRACTICAL ROTATION NUMBER DETECTOR/GATE TIMING CONTROLLER

Figure 7:
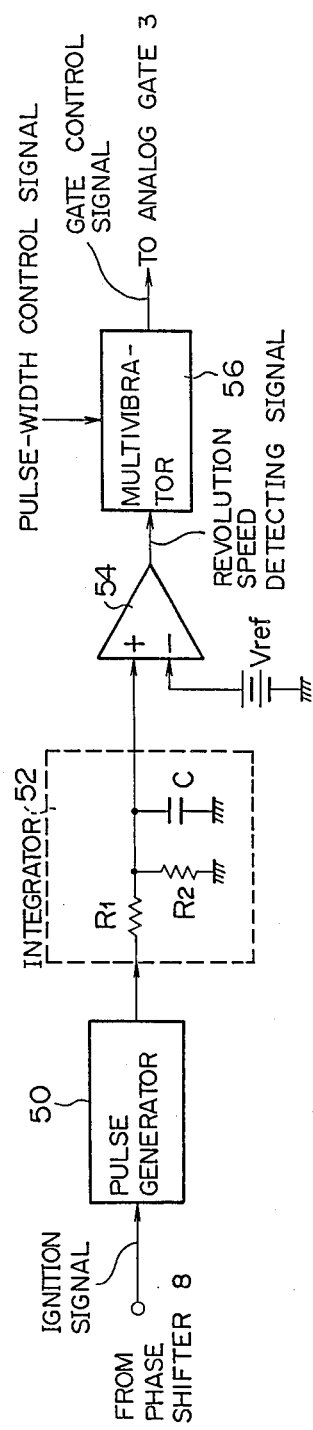
FIG. 7 is a block diagram of practical circuits of the rotation detector and gate timing controller shown in FIG. 5.
Figure 8:
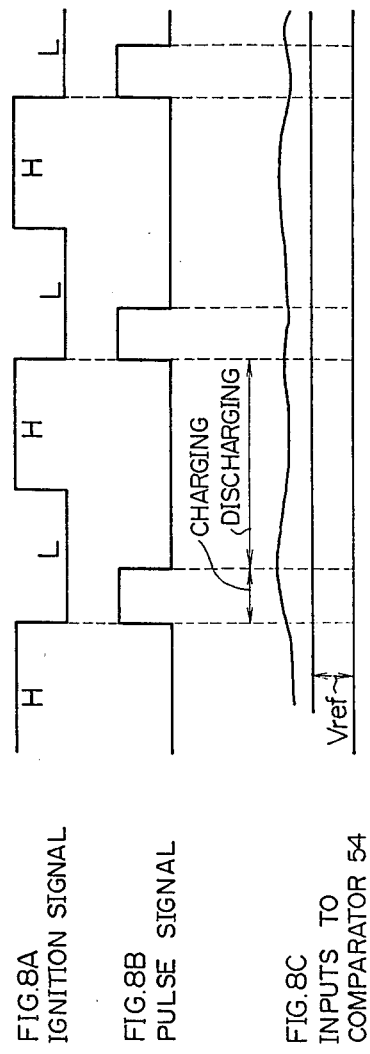
FIGS. 8A to 8C illustrate waveforms of inputs to the comparator shown in FIG. 7.

Referring now to FIGS. 7 and 8, a practical example of the rotation number detector 21 and the gate timing controller 24 that are essential in executing the basic idea of this invention.

In FIG. 7, a pulse generator 50 receives the ignition signal (FIG. 8A) from the phase shifter 8 shown in FIG. 8 and outputs a pulse signal having a pulse width as shown in FIG. 8B, using the ignition signal as a trigger signal. The pulse signal is then supplied to an integrator 52 constituted by resistors $R_1$ and $R_2$ and a capacitor C, and thus, is converted into a corresponding DC voltage there. In other words, F/V (frequency-to-voltage) conversion is performed in the integrator 52. The DC voltage is proportional to the revolution speed of the internal-combustion engine 30. The voltage signal from the integrator 52 is compared with the first reference voltage Vref (see FIG. 8C) in a first comparator 54. Only when the DC voltage from the integrator 52 is greater than the first reference voltage Vref, the first comparator 54 outputs a revolution-speed detecting signal to a mono-multivibrator (or monostable multivibrator) 56 that serves as the gate timing controller 24. In response to this revolution-speed detecting signal, the mono-multivibrator 56 outputs a gate control signal with a predetermined ON-duration time Tp to the gate control terminal of the analog gate 3 shown in FIG. 5. The ON-duration time of the gate control signal is controlled by a pulse-width control signal that comes from a controller (not shown).

As should be obvious from FIG. 7, the revolution speed detector 21 of FIG. 5 is constituted by the pulse generator 50, integrator 52 and comparator 54, whereas the gate timing controller 24 of FIG. 5 is constituted by the mono-multivibrator 56.

Charges are stored in the capacitor C of the integrator 52 via the resistor $R_1$ during the H-level pulse duration in FIG. 8B, and the accumulated charges are discharged via the resistor $R_2$ to the ground during the L-level pulse duration With proper selection of the time constants of these circuit elements, the integrator 52 is designed to always provide an output that is higher in level than the first reference voltage Vref, as indicated in FIG. 8C. Naturally, a constant comparison output can always be provided by the comparator 54.

Figure 9:
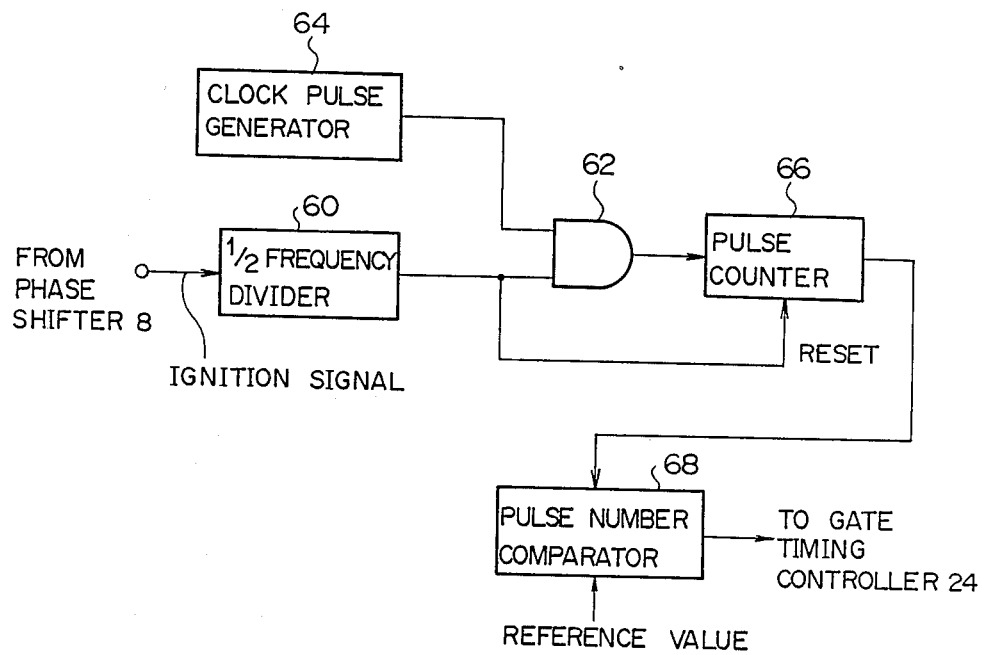
FIG. 9 is a schematic block diagram of another practical circuit of the rotation detector shown in FIG. 7.
Figure 10:
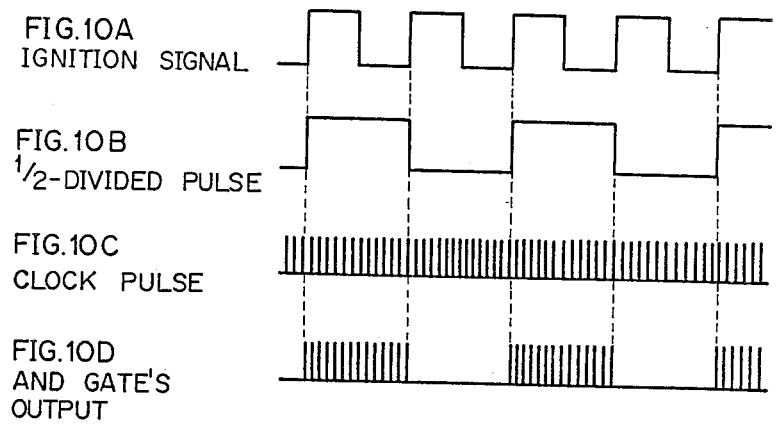
FIGS. 10A to 10D illustrate waveforms of the circuits shown in FIG. 9.

With reference to FIGS. 9 and 10, another practical circuit for the revolution speed detector 21 will be explained below.

As indicated in FIG. 10A, the ignition signal is input from the phase shifter 8 of FIG. 5 to a ½ frequency divider 60 of FIG. 9 which frequency-divides the ignition signal to provide a pulse (see FIG. 10B) with half the frequency of the ignition signal and a width corresponding to the period thereof. This pulse is sent from the ½ frequency divider 60 to one of two input terminals of an AND gate 62. Meanwhile, a clock pulse shown in FIG. 10C is generated from a clock pulse generator 64 and is supplied to the other input terminal of the AND gate 62. The frequency of the clock pulse is set to be sufficiently greater than the frequency of the ignition signal. As the AND gate 62 receives such a high-frequency clock pulse at the other input terminal, it outputs a pulse signal series as shown in FIG. 10D.

The number of the pulses of the pulse signal series from the AND gate 62 is counted by a pulse conter 66 and is then compared with a reference value (revolution-speed set value) by a pulse number comparator 68. The pulse counter 66 is so designed as to be reset by the output of the ½ frequency divider 60. When the comparison result shows that the number of the pulses included in a single pulse signal series is below the reference value, the revolution-speed detection is performed. That is, the pulse number comparator 68 detects when the period of the pulse signal series becomes smaller than the reference value. The output of the pulse number comparator 68 is supplied to gate the timing controller 24 shown in FIG. 5.

OUTPUT VOLTAGE CHARACTERISTICS OF NOISE LEVEL DETECTOR

As has been explained above, the output voltage characteristics of the noise level detector 5 can be controlled by the knocking control operations of the ignition control apparatus 100 of this invention in accordance with the driving state of the internal-combustion engine 30. Such a knocking control feature will now be explained using the characteristic curves of FIG. 11.

First, the curve A represents a reference knocking suppression control characteristic. Specifically, in the driving state of the internal-combustion engine 30 as indicated by this curve A, the output voltage characteristic of the noise level detector 5 shows that an allowable knocking noise level is generated and ensures that the output of the internal-combustion engine is equal to or greater than a predetermined level and a desirable control characteristic conforming to the design specification can be attained.

In contrast to the curve A, the curve B represents another output voltage characteristic of the noise level detector 5 in the case where the first reference voltage Vref of the comparator shown in FIG. 7 is set higher than in the curve A. According to this curve B, a higher output from the internal-combustion engine 30 can be derived by allowing occurrence of a knock sound in the speed region where the engine speed of the internal-combustion engine 30 is greater than "N1." In other words, this characteristic B is provided particularly in consideration of the output of the internal-combustion engine 30. When the speed of the engine 30 reaches "N2," the curve B would have the same inclination as the curve A. Accordingly, it is understood that the characteristic of the curve B suppresses a smaller amount of knocking, as compared with the reference characteristic indicated by the curve A.

Finally, the curve C shows the opposite characteristic to the one indicated by the curve B above the specific speed region. More specifically, the curve C is designed such that only a small level of knock sound is available in the comparator 54 (FIG. 7) by setting the reference voltage Vref of the comparator 54 smaller than the one involved in the reference characteristic of the curve A. As a result, the output of the internal-combustion engine 30 becomes small; particularly, the output voltage of the noise level detector 5 becomes lower than the one attained in the case of the curve A in the speed region where the engine speed is above "N3." The characteristic of the curve C is designed specially in view of the knock sound output and provides a low output of the internal-combustion engine 30 and a higher knocking suppression as compared with the curve B.

It should be noted that the aforementioned curves A, B and C represent the characteristics in the speed regions where the number of the engine's rotation is higher than N1, N2 and N3, respectively. Also, the knock signal here, or the noise filter's output signal, is of the same level for each curve.

The first reference voltage Vref of the comparator 54 of FIG. 7 is set highest for the curve B and lowest for the curve C with Vref for the curve A inbetween. In other words, the amount of the knocking sound detected is the largest for the curve C and the smallest for the curve B. As will be described later, the retard quantity 0 at the time of the ignition is the largest for the curve C ($\theta_C$), smallest for the curve B ($\theta_B$) and inbetween for the curve A.

As described above, the knocking (ignition) control apparatus 100 of this invention is characterized in that the knocking control characteristic can be varied to provide the desired output voltage characteristic of the noise level detector 5, for example, the one shown in any of the curves A-C, in accordance with the driving state of the internal-combustion engine 30.

KNOCKING CONTROL OPERATION WAVEFORMS

Figure 11:
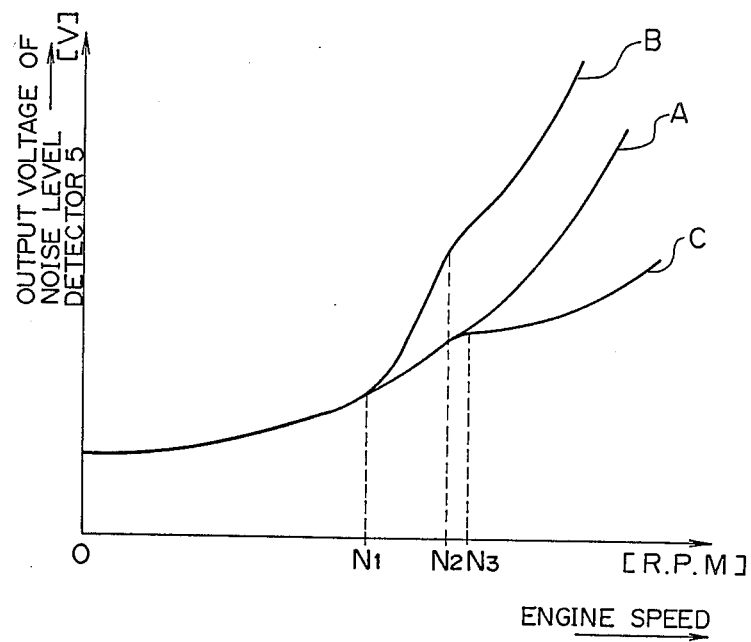
FIG. 11 is a graphic representation of rotation/noise level curves.

FIGS. 12 to 14 illustrate the operation waveforms for each circuit component of the ignition control apparatus 100 of FIG. 5, with respect to the respective output voltage curves A to C of FIG. 11. That is, FIGS. 12A to 12H correspond to the reference characteristic curve A, FIGS. 13A to 13H to the characteristic curve B designed in view of the engine output, and FIGS. 14A to 14H to the last characteristic curve C designed in view of the knock sound output.

In FIG. 13D, it is clearly shown that the output 94 of the noise level detector 5 is larger than the output 90 for the reference characteristic "A" shown in FIG. 12D, in the speed region where the revolution speed (i.e., engine speed) of the internal-combustion engine 30 of FIG. 11 is above N1, and that the retard (delay) amount $\theta_B$ with respect to the ignition timing is smaller than $\theta_A$ for the reference characteristic. Further, the outputs of the comparator 6 and the integrator 7 (see FIGS. 13E and 13F) are lower than the respective ones for the reference characteristic shown in FIGS. 12E and 12F.

It should be clear from FIG. 14D that the output 98 of the noise level detector 5 is smaller than the output 90 for the reference characteristic "A" shown in FIG. 12D, in the speed region where the revolution speed of the internal-combustion engine 30 of FIG. 11 is above N3, and that the retard amount $\theta_C$ with respect to the ignition timing is larger than $\theta_A$ for the reference characteristic "A". Further, the outputs of the comparator 6 and the integrator 7 (FIGS. 14E and 14F) are higher than the respective ones for the reference characteristic "A" shown in FIGS. 12E and 12F.

As explained above in detail, this preferred embodiment permits the knocking suppression characteristics to be freely varied by setting at the desired value, the first reference voltage Vref of the comparator 54 that constitutes the revolution speed detector 21.

In the ignition controlling apparatus 100 shown in FIG. 5, the ON-duration time (Tp) of the gate control signal is controlled by the aforementioned method 1. This duration control is not, however, limited to the method 1; it may be executed using the method 2 as shown in FIGS. 15A and 15B as well as the method 3. The circuit means to carrying out these methods is itself known so that its explanation will be omitted.

SECOND IGNITION CONTROLLING MODE

Figure 16:
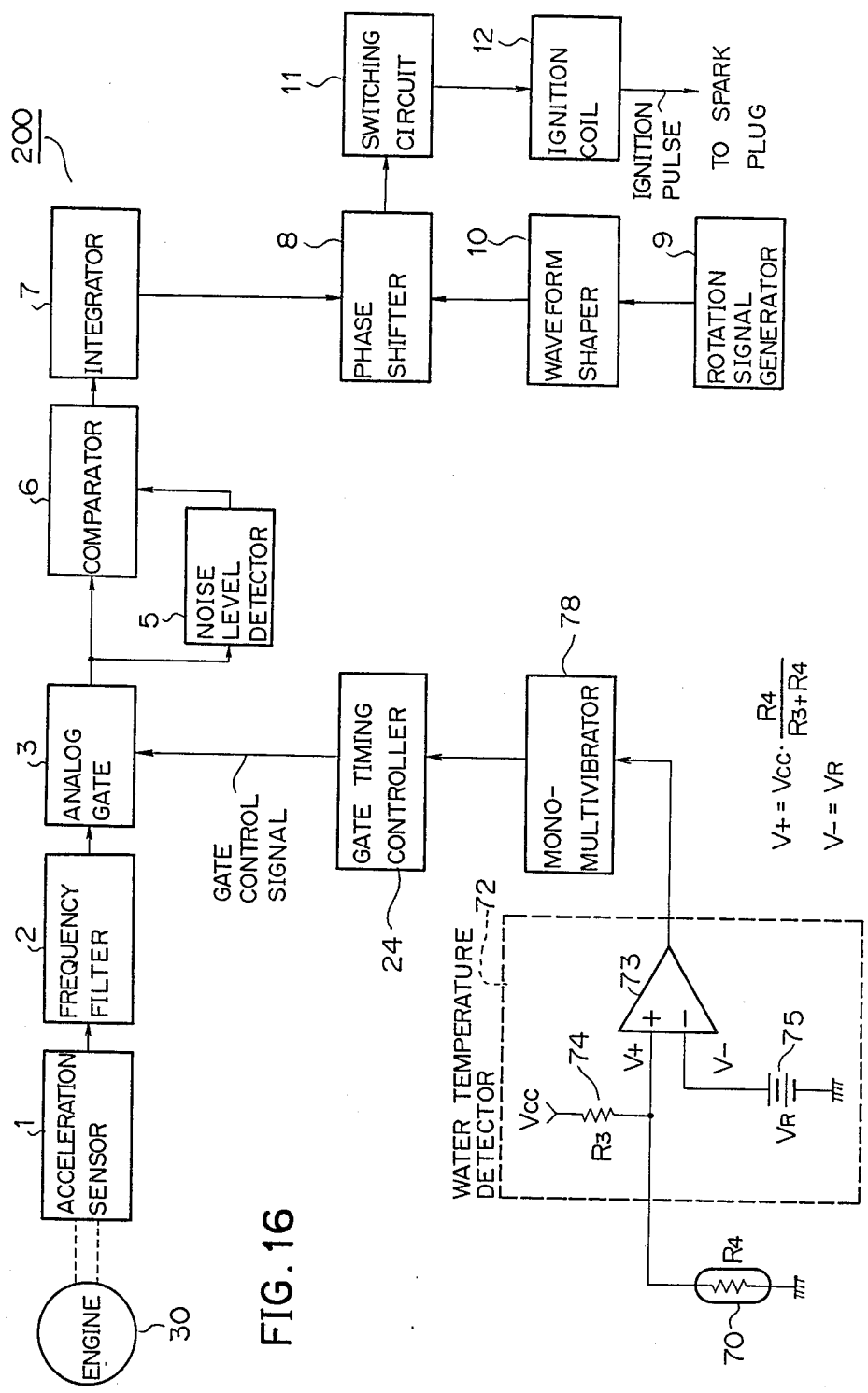
FIG. 16 is a schematic diagram of an ignition controlling apparatus 200 according to a second preferred embodiment of the invention.

Referring now to FIG. 16, the ignition controlling apparatus 200 according to the second embodiment will be explained in detail.

It is apparent from the circuit diagram of FIG. 6 that most parts of this circuit are the same as those of the circuit of the first embodiment shown in FIG. 5, so they are denoted by the same reference numerals, thus omitting their explanations.

The following is the explanation of only the different and featured products of the circuit of FIG. 16.

In the previous ignition controlling apparatus 100 according to the first embodiment shown in FIG. 5, a predetermined ignition control operation was carried out based on the output signal of the phase shifter 8 that corresponds to the revolution speed (i.e., engine speed) of the internal-combustion engine 30. According to the second embodiment, however, instead of using the output signal of the phase shifter corresponding to the engine's revolution speed, for example, water temperature information of a radiator (not shown) is utilized in order to perform the desired ignition control operations.

In FIG. 16 a water temperature sensor 70 is provided to measure the water temperature of the radiator of the internal-combustion engine 30 (not shown in detail). This water temperature sensor 70 may be constituted by a thermistor having a resistance $R_4$. It is well known in the art that the resistance $R_4$ of the thermistor varies non-linearly with respect to a change in water temperature. The output terminal of the water temperature sensor 70 is coupled to a positive input terminal of a third comparator 73 in a water temperature detector 72, with this positive input terminal being further coupled to a positive power source $V_{CC}$ through a resistor 74 having a resistance $R_3$. A negative input terminal of the third comparator 73 is coupled to a reference power source 75 with a voltage value of $V_R$ and with its negative terminal grounded. The output of thus constituted water-temperature detector 72 is supplied through a mono-multivibrator 78 to the gate timing controller 24.

The voltage (V+) at the positive input terminal of the third comparator 73 is defined by $$V_{CC} \times \frac{R_4}{R_3 + R_4}$$

and the voltage (V−) is defined by $V_R$. Under this situation, when (V+) varies with a change in water temperature of the radiator, the comparator 73 provides its output in the low temperature region of (V+)>(V−).

In other words, according to the ignition control apparatus 200 of the second embodiment, the water temperature detector 72 detects the present water temperature by way of the resistance $R_4$ of the water temperature sensor 70. Based on this detected output, the mono-multivibrator 78 performs the ON/OFF control of the analog gate 3 through the gate timing controller 24 in consideration of the time corresponding to the revolution angle of the engine 30.

MODIFICATIONS

In the above, two preferred embodiments of this invention have been explained with reference to FIGS. 5 and 16. Needless to say, the present invention is not limited to these particular embodiments, but may be modified in various manners within the scope and spirit of the invention.

For instance, in the foregoing explanation, the operation of the analog gate 3 was controlled in accordance with the revolution speed of the engine, i.e., the engine speed and/or the water temperature of the radiator. However, the same type of gate control may be effected by detecting the temperature of compressed oil in an air inlet tube. In addition, if such a temperature-dependent control is carried out with a control involving the revolution speed of the engine, the analog gate 3 may be controlled more precisely.

Further, if the gate timing controller 24 is constituted using a microprocessor, the pulse width of its output may freely controlled by a computer program.

Furthermore, the ignition signal output from the waveform shaper 10 may be directly used as an input to the revolution speed detector 21 without any problem and still the same characteristic as attained in the aforementioned embodiments can be provided.

In addition, it should be also noted that this invention can be applied to the knocking suppression systems such as a pressure gate control system and a fuel control system.

As explained above, according to the present invention, in executing suppression of knocking occurred in an internal-combustion engine by detecting an engine drive information signal including knocking information of the internal-combustion engine and then detecting a knocking information signal from the result of comparison between this engine-drive information signal and a reference voltage signal derived from the engine-drive information signal, the supply of the engine-drive information signal to the comparator is interrupted for a certain period of time. This interruption duration is controlled in accordance with the driving condition (knocking condition) of the engine. Accordingly, it is assured that the knocking information signal can be detected and the knocking phenomenon can be suppressed without any restriction by either the characteristic of the detected knocking information signal, or the characteristics of the internal-combustion engine.

What is claimed is:

1. An electronic ignition control apparatus comprising:
    first detecting means for detecting mechanical vibrations of an internal-combustion engine to derive a vibration signal containing at least mechanical noise information and knocking phenomenon information of the internal-combustion engine;
    gating means for gating the vibration signal supplied from the first detecting means;
    second detecting means for detecting a noise level of said vibration signal derived from the first detecting means via the gating means to produce a reference voltage signal;
    generating means for generating a reference revolution signal representative of drive conditions of the internal-combustion engine;
    processing means for processing the vibration signal directly supplied from the first detecting means via the gating means based upon the reference voltage signal of the second detecting means and the reference revolution signal of the generating means, so as to produce an ignition signal;
    third detecting means for detecting the ignition signal from the processing means to produce a revolution-speed detecting signal corresponding to an engine speed of the internal-combustion engine; and
    gate controlling means for producing a gate control signal by receiving both the ignition signal and the revolution-speed detecting signal, whereby said gating means is controlled in response to the gate control signal in order to interrupt supply of the vibration signal to the processing means while a knocking phenomenon occurs, a time period of said vibration signal interruption being varied in response to the drive conditions of the internal-combustion engine so as to suppress the knocking phenomenon of the internal-combustion engine.

2. An electronic ignition control apparatus as claimed in claim 1, wherein the third detecting means includes:
    a pulse generator for generating a pulse signal in response to the ignition signal supplied from the processing means;
    a first integrator for integrating the pulse signal to output an integrated pulse signal;
    a first comparator for comparing the integrated pulse signal with a first reference voltage (Vref) so as to derive the revolution-speed detecting signal, and
    the gate controlling means includes a mono-stable multivibrator having a pulse-width control signal terminal, for producing the gate control signal in response to the revolution-speed detecting signal from the first comparator.

3. An electronic ignition controlling apparatus as claimed in claim 2, wherein the first integrator includes:
    a first resistor;
    a second resistor series-connected to the first resistor; and
    a capacitor (C) parallel-connected to the second resistor, said first, second resistors and capacitor (C) being selected to each have a preselected value so as to obtain the level of the integrated pulse signal continuously higher than the first reference voltage (Vref), whereby the first comparator continuously outputs the revolution-speed detecting signal having a predetermined value.

4. An ignition controlling apparatus as claimed in claim 1, wherein the third detecting means includes:

a clock pulse generator for generating a clock pulse having a frequency higher than a frequency of the ignition signal;

a frequency divider for frequency-dividing the ignition signal supplied from the processing means to derive a frequency-divided ignition signal;

an AND gate for AND-gating the clock pulse and the frequency-divided ignition signal to output a pulse signal series;

a pulse counter for counting pulse numbers of the pulse signal series; and, pulse-number comparator for comparing the counted pulse numbers of the pulse signal series with a reference pulse number so as to derive the revolution-speed detecting signal.

5. An ignition controlling apparatus as claimed in claim 1, wherein the processing means includes:

a second comparator for comparing the vibration signal supplied from the first detecting means via the gating means with the reference voltage signal supplied from the second detecting means to output a comparator output pulse;

a second integrator for integrating the comparator output pulse to produce an integration voltage proportional to an intensity of the knocking phenomenon; and a phase shifter for phase-shifting the reference revolution signal of the generating means based upon the integration voltage so as to produce the ignition signal.

6. An ignition controlling apparatus as claimed in claim 1, further comprising a frequency filter for frequency-filtering the vibration signal derived from the first detecting means so as to pass a signal component thereof having a higher frequency-sensitivity with respect to the knocking phenomenon of the internal-combustion engine.

7. An ignition controlling apparatus as claimed in claim 1, further comprising:

a switching circuit for switching the ignition signal supplied from the processing means to produce an ignition switching signal; and, an ignition coil for producing a high-voltage ignition pulse in response to the ignition switching signal.

8. An ignition controlling apparatus as claimed in claim 1, further comprising a waveform shaper for shaping the reference revolution signal supplied from the generating means.

9. An ignition controlling apparatus as claimed in claim 1, wherein the first detecting means is an acceleration sensor mechanically coupled to the internal combustion engine.

10. An ignition controlling apparatus as claimed in claim 1, wherein the second detecting means is a noise level detector for detecting from the vibration signal of the first detecting means, the mechanical noise information other than the knocking phenomenon information.

11. An electronic ignition control apparatus comprising:

first detecting means for detecting mechanical vibrations of an internal-combustion engine to derive a vibration signal containing at least mechanical noise information and knocking phenomenon information of the internal-combustion engine;

gating means for gating the vibration signal supplied from the first detecting means;

second detecting means for detecting a noise level of said vibration signal derived from the first detecting means via the gating means to produce a reference voltage signal;

generating means for generating a reference revolution signal representative of drive conditions of the internal-combustion engine;

first processing means for processing the vibration signal directly supplied from the first detecting means via the gating means based upon the reference voltage signal of the second detecting means and the reference revolution signal of the generating means, so as to produce an ignition signal;

third detecting means for detecting water-temperature information of the internal-combustion engine to derive a water-temperature signal;

second processing means for processing the water-temperature signal supplied from the third detecting means to produce a timing signal representative of the water-temperature information of the internal-combustion engine; and, gate controlling means for producing a gate control signal by receiving the water-temperature information from the second processing means so as to control the gating means, based upon the gate control signal, in order to interrupt supply of the vibration signal to the processing means while the knocking phenomenon occurs, a time period of said vibration signal interruption being controlled in accordance with the drive conditions of the internal-combustion engine so as to suppress the knocking phenomenon of the internal-combustion engine.

12. An electronic ignition apparatus as claimed in claim 11, wherein the third detecting means includes:

a thermistor thermally coupled to the internal-combustion engine; and a water-temperature detector having a third comparator, and the second processing means includes a mono-stable multivibrator.

13. An ignition controlling apparatus as claimed in claim 11, wherein the processing means includes:

a second comparator for comparing the vibration signal supplied from the first detecting means via the gating means with the reference voltage signal supplied from the second detecting means to output a comparator output pulse;

a second integrator for integrating the comparator output pulse to produce an integration voltage proportional to an intensity of the knocking phenomenon; and a phase shifter for phase-shifting the reference revolution signal of the generating means based upon the integration voltage so as to produce the ignition signal.

14. An ignition controlling apparatus as claimed in claim 11, further comprising a frequency filter for frequency-filtering the vibration signal derived from the first detecting means so as to pass a signal component thereof having a higher frequency-sensitivity with respect to the knocking phenomenon of the internal-combustion engine.

15. An ignition controlling apparatus as claimed in claim 11, further comprising:

a switching circuit for switching the ignition signal supplied from the processing means to produce an ignition switching signal; and, an ignition coil for producing a high-voltage ignition pulse in response to the ignition switching signal.

16. An ignition controlling apparatus as claimed in claim 11, further comprising a waveform shaper for shaping the reference revolution signal supplied from the generating means.

17. An ignition controlling apparatus as claimed in claim 11, wherein the first detecting means is an acceleration sensor mechanically coupled to the internal combustion engine.

18. An ignition controlling apparatus as claimed in claim 11, wherein the second detecting means is a noise level detector for detecting from the vibration signal of the first detecting means, the mechanical noise information other than the knocking phenomenon information.

* * * * *